Aug. 7, 1923.
F. E. FANTZ
1,464,067
AUTOMATIC FISHING POLE
Filed Feb. 23, 1922
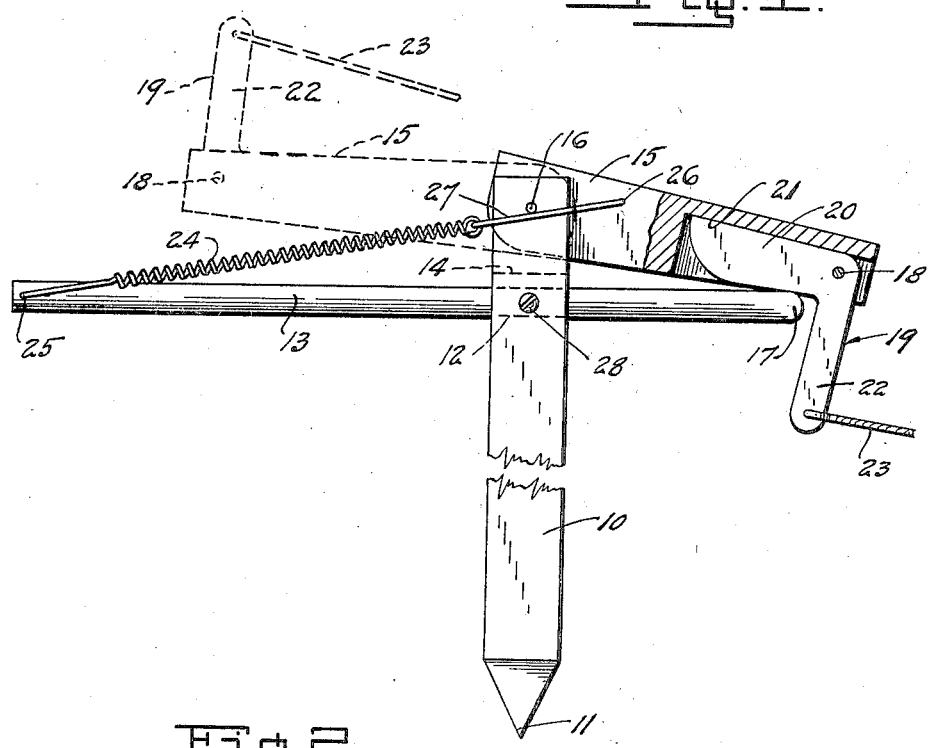
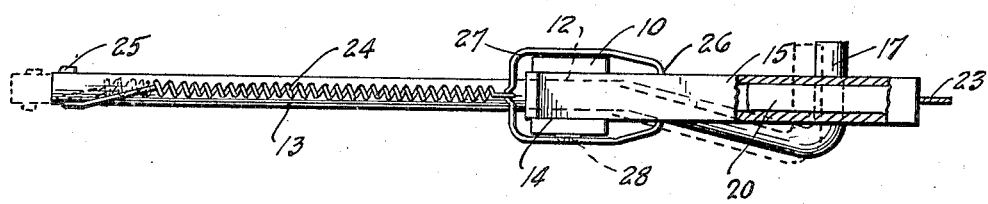
Inventor
Franklin E. Fantz
By Watson E. Coleman
Attorney Patented Aug. 7, 1923.

1,464,067

UNITED STATES PATENT OFFICE.

FRANKLIN E. FANTZ, OF MUNCIE, INDIANA.

AUTOMATIC FISHING POLE.

Application filed February 23, 1922. Serial No. 538,627.

*To all whom it may concern:*

Be it known that I, FRANKLIN E. FANTZ, a citizen of the United States, residing at Muncie, in the county of Delaware and State of Indiana, have invented certain new and useful Improvements in Automatic Fishing Poles, of which the following is a specification, reference being had to the accompanying drawings.

This invention relates to improvements in automatic fish poles.

An important object of the invention is to provide an improved device of the above character by which the pull exerted by the fish releases a spring to act upon a lever whereby a pull is exerted on the line in opposition to the pull of the fish to engage the hook.

A further object of the invention is to provide a device of this character which may be readily assembled and dis-assembled and which is extremely simple in construction.

A still further object of the invention is to provide a device of this character in which common means are employed for holding the line in set position and moving the line to the sprung position.

A further object of the invention is to provide a device of this character which is adjustable both in the amount of pull necessary to be exerted by the fish to spring the device and the amount of strain placed upon the line by the device when sprung.

Other objects and advantages of the invention will become apparent throughout the course of the following description.

In the accompanying drawings wherein for the purpose of illustration is shown a preferred embodiment of my invention and wherein like reference characters designate like parts throughout:

Figure 1 is a side elevation, a portion of the lever being broken away; and

Figure 2 is a top plan view.

Referring now more particularly to the drawings, the numeral 10 indicates a ground engaging member pointed at its lower end, as at 11, and provided adjacent its upper end, but at a point spaced therefrom, with an opening 12 through which is extended a support 13, the purpose of which will presently appear. The upper end of the ground engaging member 10 is bifurcated, as at 14, to form spaced arms intermediate which is extended one end of a lever 15, a removable pivot 16 extending through the arms and the lever.

The free end of the lever 15 engages against an angular portion 17 formed on the support 13 at one end thereof and has pivoted thereto, as at 18, a lever 19. In the present instance the lever 19 is disclosed as a bell crank lever, one arm 20 of which is disposed in a recess 21 formed in the under side of the lever 15, the lower surface of the arm 20 engages against the angular portion 17 of the support 13. The other arm 22 of the bell crank lever is provided with an opening adapted for the reception of one end of a fish line 23, the opposite end of which will be provided with a baited hook in the usual manner, the same not being herein disclosed.

A tension spring 24 has one end engaged with the opposite end of the support 13 from the angular portion 17 thereof, as at 25, and the other end engaged with an opening 26 formed in the lever 15. In the present instance the engagement of the spring 24 in the opening 26 is obtained through the medium of an elliptical link 27 engaged in the opening and to which the end of the spring is secured so that the tension of the spring will be brought to bear upon the lever longitudinally thereof and not at an angle. The opening 26 is so arranged with respect to the opening 25 that the axis of the spring when the lever is in the position shown in solid lines in Figure 1 lies toward the support 13 from the axis of the pivot 16 of the lever so that the lever when in this position is constantly urged by the spring toward the angular portion 17 of the support.

In the use of the device the ground engaging member 10 is forced into the ground and the lever 15 moved to the position shown in solid lines in Figure 1 where, as hereinbefore explained, the spring 24 constantly urges the free end of the lever toward the angular portion 17 of the support. The baited line is then attached to the arm 22 and the device is in the set position. If a pull is exerted upon the line, this pull will cause the arm 20 of the bell crank lever to engage against the angular portion 17 of the support 13 and elevate the free end of the lever 15 moving the line drawn through the openings 25 and 26 to a point above the axis of the pivot 16 with respect to the support 13. In this position the spring 24 exerts pressure upon the lever to throw the same into the dotted position shown in Figure 1, causing a jerk to be applied to the line to hook the fish. Where it is desired that the device shall operate upon a slight jerk, as for example when the operator is fishing for small fish, the support 13 may be shifted longitudinally to bring the angular portion 17 thereof nearer to the pivot point 18 of the bell crank 19 so that pull upon the arm 22 will exert a greater pressure to elevate the lever 15. By this movement the tension of the spring 24 is likewise relaxed so that the pull thereof in springing the device is lightened thereby preventing tendency to tear the hook from the fish's mouth. If large fish are being sought, the support 13 may be adjusted to move the angular portion 17 thereof toward the free end of the arm 20 of the bell crank lever thereby increasing the amount of pressure necessary to elevate the lever 15 and increasing the tension of the spring 24. The support 13 may be held in adjusted position by means of a set screw 28 extending through the ground engaging member and engaging the same.

From the foregoing it is believed to be obvious that an automatic fishing pole constructed in accordance with my invention is particularly well adapted for the use for which it is intended by reason of the fact that it provides for adjustability of the pull necessary to spring the device and the reactive pull caused thereby and by reason of the fact that the same is extremely simple in its construction and very easy to set. It will furthermore be obvious that the construction as hereinbefore set forth is capable of many changes and modifications without in any manner departing from the principles of construction hereinbefore set forth and of which the drawings and specification are merely a specific example. I do not, therefore, wish to be understood as limiting myself to such specific structure except as hereinafter claimed.

I claim:—

1. In a fishing device, a pivoted lever normally disposed in one position, means for imparting an initial movement to the lever including a fish line connected with the lever, and single means for retaining the lever in the first named position and for causing a further movement of the lever subsequently to the imparting of the initial movement thereto by the first named means.

2. In a fishing device, a pivoted lever normally disposed in one position, means for imparting an initial movement to the lever including a fish line connected with the lever, single resilient means for retaining the lever in the first named position and for causing a further movement of the lever subsequently to the imparting of the initial movement thereto by the first named means, and single means for regulating the amount of force which must be applied to the fish line to impart an initial movement to the lever and to regulate the tension of the resilient means.

3. In a fishing device, a pivoted lever movable in one direction to set and in the opposite direction to sprung position, means applying strain to the lever and normally holding the lever in set position, and fish operated means for imparting an initial movement to the lever toward sprung position, said first named means operating to further move the lever in said direction to sprung position after the lever has been initially moved by the fish operated means.

4. In a device of the type described, a pivoted lever, a member against which the free end of the lever abuts, a second lever pivoted to the first named lever and having the work arm thereof engaged with said member, the power arm of said second lever being adapted for connection to a fish line, and means applying strain to the first named lever and operative to shift the lever subsequently to the movement thereof by the second lever in the direction of movement imparted thereto by said second lever.

5. In a device of the type described, a pivoted lever, a member against which the free end of the lever abuts, a second lever pivoted to the first named lever and having the work arm thereof engaged with said member, the power arm of said second lever being adapted for connection to a fish line, and means applying strain to the first named lever and operative to shift the lever subsequently to the movement thereof by the second lever in the direction of movement imparted thereto by said second lever, said strain applying means normally holding said lever in engagement with said member.

6. In a device of the type described, a pivoted lever, a member against which the free end of the lever abuts, a second lever pivoted to the first named lever and having the work arm thereof engaged with said member, the power arm of said second lever being adapted for connection to a fish line, means applying strain to the first named lever and operative to shift the lever subsequently to the movement thereof by the second lever in the direction of movement imparted thereto by said second lever, and means for altering the effective lengths of the power and work arms of the second lever.

7. In a device of the type described, a pivoted lever, a member against which the free end of the lever abuts, a second lever pivoted to the first named lever and having the work arm thereof engaged with said member, the power arm of said second lever being adapted for connection to a fish line, means applying strain to the first named lever and operative to shift the lever subsequently to the movement thereof by the second lever in the direction of movement imparted thereto by said second lever, and means for adjusting said member longitudinally of the work arm of said second lever.

8. In a device of the type described, a support, a lever pivoted to the support, a member carried by the support against which the free end of the lever abuts, a second lever pivoted to the first named lever and having the work arm thereof engaged with said member, the power arm of said second lever being adapted for engagement by a trip line, and a spring connected with the first named lever and with said member for moving the first named lever in the direction of movement thereof by the second lever and operative subsequently to movement of the first lever by the second lever.

9. In a device of the type described, a support, a lever pivoted to the support, a member carried by the support against which the free end of the lever abuts, a second lever pivoted to the first named lever and having the work arm thereof engaged with said member, the power arm of said second lever being adapted for engagement by a trip line, and a spring connected with the first named lever and with said member for moving the first named lever in the direction of movement thereof by the second lever and operative subsequently to movement of the first lever by the second lever, said spring normally tending to hold said lever in engagement with said member.

10. In a device of the type described, a support, a lever pivoted to the support, a member carried by the support against which the free end of the lever abuts, a second lever pivoted to the first named lever and having the work arm thereof engaged with said member, the power arm of said second lever being adapted for engagement by a trip line, a spring connected with the first named lever and with said member for moving the first named lever in the direction of movement thereof by the second lever and operative subsequently to movement of the first lever by the second lever, and means for adjusting said member longitudinally whereby to vary the tension of said spring and the operative length of the work arm of said second lever.

11. In a device of the type described, the combination with a pivoted lever and a member against which the free end of the lever abuts when in a set position, a second lever pivoted to one end of the first lever and having the work arm thereof engaging the other end of the first lever, the power arm of said second lever being adapted for connection with a fish line, and means applying strain to the first named lever and operative to shift the lever subsequently to movement thereof by the second named lever in the direction of movement imparted thereto by said second named lever.

In testimony whereof I hereunto affix my signature.

FRANKLIN E. FANTZ.